United States Patent

Prescott

[15] 3,673,507

[45] June 27, 1972

[54] TWO CHANNEL READ AMPLIFIER

[72] Inventor: Robert S. Prescott, Lexington, Mass.

[73] Assignee: Honeywell Inc., Minneapolis, Minn.

[22] Filed: April 29, 1970

[21] Appl. No.: 33,029

[52] U.S. Cl. ..............................................330/30 R, 330/51
[51] Int. Cl. ..............................................H03f 3/68
[58] Field of Search.............307/241; 328/152, 154; 330/30, 330/51, 22

[56] References Cited

UNITED STATES PATENTS

| | | | |
|---|---|---|---|
| 2,464,353 | 3/1949 | Smith et al. | 330/51 X |
| 3,350,571 | 10/1967 | Moulton et al. | 330/51 X |
| 3,304,507 | 2/1967 | Weekes et al. | 330/51 X |

*Primary Examiner*—Roy Lake
*Assistant Examiner*—Lawrence J. Dahl
*Attorney*—Fred Jacob and Leo Stanger

[57] ABSTRACT

Two amplification channels for use with a read-head of a tape transport device of a computer system comprised of transistors, and associated diodes, resistors and capacitors, are each independently set for optimum response to one of two modes of information stored on a magnetic medium. Electronic switching means are provided for activating one channel or the other in accordance with the type of signal being read. The operating points of the two amplification channels are stabilized by a common biasing means.

18 Claims, 2 Drawing Figures

INVENTOR
ROBERT S. PRESCOTT
BY Nicholas Prasinos
ATTORNEY

TWO CHANNEL READ AMPLIFIER

BACKGROUND OF THE INVENTION

In a modern electronic computer system there are a number of ways of recording binary information on a magnetic surface. One commonly used method is to record bits of information on magnetic tape. Here, elementary units of magnetization to two polarities are impressed on the magnetic tape in a pattern representing either a zero or a one. There are various patterns or codes which can be used. One method of recording information on magnetic tape is the return-to-zero (RZ) method which uses round-trip excursion from zero flux to one saturation level to represent a zero and a round-trip excursion to the other saturation level to represent a one. Another technique is the non-return-to-zero recording which identifies a digit with a flux excursion from a reference state usually a saturation state to the opposite saturation state. Non-return-to-zero (NRZ) recording identifies a digit by means of a flux change, a change from one state to the other normally representing a one, and no change representing a zero. Still another mode of recording information on magnetic tape is known as phase-encoding or (PE) mode. In this type of recording there is a flux change which contains the information in the center of the digit interval. This type is also an NRZ-type of recording in that the flux is always in one of the saturation states except during flux changes; here we have the greatest frequency when a string of digits are the same and the least frequency when the ones and zeros alternate. Hence, with different modes of recording we have different densities of flux reversals; with PE recording we have a higher reversal rate than with NRZ recording. Since the recovered signal is proportional to the time rate-of-change of flux, the frequency of the recovered signal will be different in accordance with the type of recording used. Consequently, an amplifier which will be suitable to give optimum amplification for one type signal will be unsuitable for the other.

Accordingly, it is a primary object of the present invention to provide a two-channel amplifier which can provide optimum amplification for either of two types of electric signals.

It is another object of the invention to provide a dual-channel amplifier having single input and single output meanS and selecting means for selecting the proper channel.

It is still a further object of this invention to provide in combination with a tape-transport device a dual channel amplifier of optimally amplifying information read from a tape having been encoded with either NRZ or PE.

These and other objects of the present invention, together with various features thereof, will become apparent from the following detailed specification when read with the accompanying drawings.

SUMMARY OF THE INVENTION

The foregoing objects of the invention are attained by a circuit, for use with a read-head of a tape transport device of a computer system, having a common input and a common output which provides optimum filtering and gain to each of two different types of signals read out of storage on a magnetic surface. Each channel is comprised of transistors with associated resistors, capacitors, and diodes; the gain of one channel is set by adjusting a variable resistor connected to the emitter of a transistor forming one stage of a two-stage amplifier performing optimally to one set of signals; the gain of the other channel is similarly set to respond optimally to another set of conditions. Selection of either channel is performed by forward biasing one transistor to the conducting state which forward biases a diode in one channel permitting input signals to pass into that channel, whereas another transistor is reversed biased to the non-conducting state which reverse biases another diode in the other channel and effectively open circuits the second channel.

One feature of this invention is a circuit coupled to the two channel amplifier which stabilizes its operating point.

BRIEF DISCUSSION OF THE DRAWINGS

Other objects and advantages of the invention will become obvious from a consideration of the following descriptions of the claims, taken together with accompanying drawings, wherein:

DETAILED DESCRIPTION OF THE INVENTION

Figure 1:
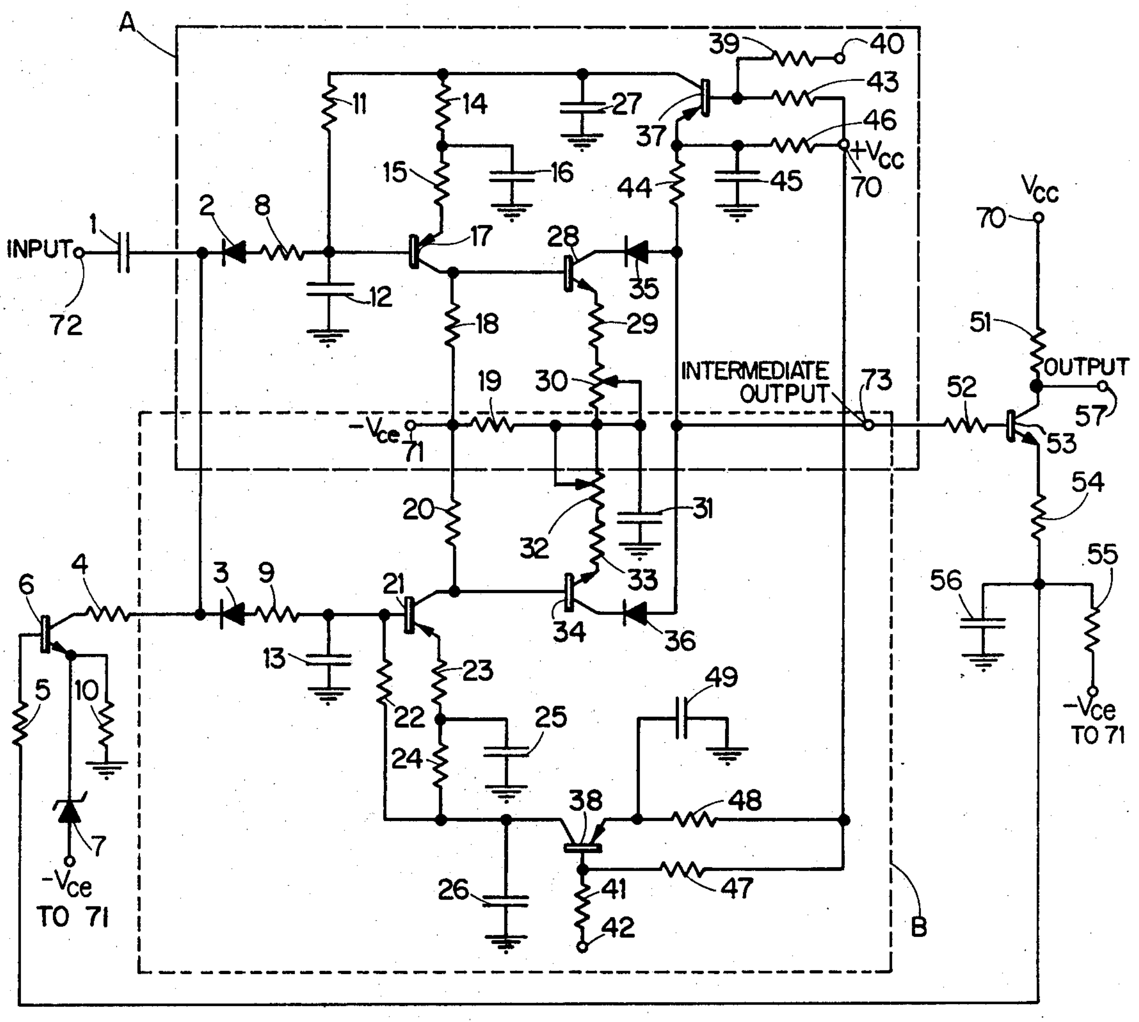
FIG. 1 is an equivalent circuit of the invention.

FIG. 1, the component parts in the circuit of the present invention can be visualized in conjunction with the following description.

The positive voltage of the amplifiers is provided at terminal 70, whereas negative voltage is provided at terminal 71. The input for signals to be amplified is provided at terminal 71. The input for signals to be amplified is provided at terminal 72 and an intermediate output is taken from terminal 73.

That part of the circuit enclosed by a dash line represents one channel labeled "A," whereas that part of the circuit enclosed by a dotted line represents channel "B." Considering first channel A, a capacitor 1 has one plate connected to input 72, whereas its other plate is connected to the cathode of diode 2. The anode of diode 2 is connected to a resistor 8; resistor 8 is also connected to the base of transistor 17, to a resistor 11, and also to ground through a capacitor 12. The emitter of transistor 17 is connected to 2 resistors, 14 and 15, which are connected at their junction to ground through a capacitor 16. Resistor 14 is further connected to resistor 11 and also to the collector of transistor 37. Back-tracking to transistor 17 again, it is seen that the collector of transistor 17 is connected to a negative voltage through resistor 18; it is also directly connected to the base of an NPN transistor 28. The emitter of transistor 28 is connected in series to a resistor 29, and to a variable resistor 30, which in turn is connected signal wise to ground through capacitor 31. The collector of transistor 28 is connected to the cathode of diode 35, whereas the anode of diode 35 is connected through resistor 44 to the emitter of PNP transistor 37 and also through resistor 46 to the positive terminal 70; and it is also coupled to ground through a capacitor 45. The base of transistor 37 is connected to pin 40 through a resistor 39 and is also connected to positive terminal 70 through resistor 43. The collector of tranSistor 37 is coupled to ground through capacitor 27 and also coupled to PNP transistor 17 as previously described.

The intermediate output 73 is normally connected to the base of an NPN transistor 53 through resistor 52, and the collector of NPN tranSistor 53 is connected to a positive voltage terminal 70 through resistor 51, whereas the emitter of NPN transistor 53 is connected to a negative voltage terminal 71, through resistors 54 and 55 which are electrically connected to each other in series. The junction of resistors 54 and 55 is connected parallel to ground through capacitor 56, and also to the base of transistor 6 through resistor 5. The emitter of transistor 6 is connected to a zener diode 7 and to a negative potential and ground through resistor 10; whereas the collector of NPN transistor 6 is coupled to the dual channel amplifier through resistor 4. An output terminal 57 is coupled between the collector of transistor 53 and resistor 51.

Channel B is similar to channel A, each component in channel B having a corresponding element in channel A which has thus far been described.

Figure 2:
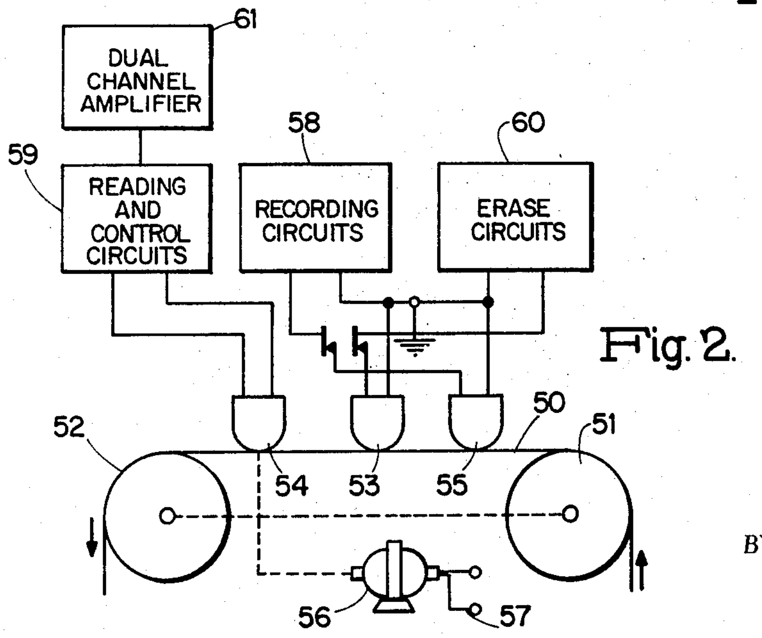
FIG. 2 is a block schematic drawing of the invention in combination with a tape transport device.

In FIG. 2, a magnetic tape 50 is being driven by a pair of pneumatic-drive capstans, 51 and 52, past a data transfer means which comprise, for example, a head 53, which is adapted either for recording or erasing purposes, a reading head 54, and a further head 55 which is adapted for either recording or erasing purposes. The movement of the tape by the drive capstans 51 and 52 may be by way of any suitable drive motor 56, which is connected via terminals 57 to a power source not shown.

Cooperating with the various data transfer heads 53–55 are suitable recording circuits and erase circuits represented by blocks 58 and 60. Cooperating with read head 54 are reading and control circuits represented by block 59 which are then coupled to the dual-channel amplifier previously described and represented by block labeled 61.

Assuming we are reading from the read head 54 on FIG. 2, in the mode of operation that requires the selection of channel A. A manually or logically operated switch (not shown) on the tape control unit is placed in the position so that channel A is selected. When the manually controlled switch is thrown in mode A operation, transistor 37 on FIG. 1 is turned on by supplying ground to pin 40 through resistor 39. The emitter of PNP transistor 37 is supplied with positive voltage +*Vcc* through resistor 46. Since this is a PNP transistor, the positive voltage biases the emitter base junction in the forward state and turns on the transistor 37 which makes the junctiOn of resistor 11 positive, hence making the anode of diode 2 more positive than its cathode, which is the forward bias state of diode 2. Hence, input signals introduced at input 72 have a low resistance path toward the first pre-amplifier stage of channel A. Simultaneously with this action, when the manual switch (not shown) is placed in mode A operation, channel B is turned off as follows: the base of PNP transistor 38 is at the same potential as the emitter of transistor 38 since both base and emitter are connected through resistors 47 and 48 respectively to the positive terminal 70, whereas pin 42 is not grounded; since it requires a difference of potential between base and the emitter to turn the transistor 38 on, and since the base and emitter are equi-potential in this instance, the collector of transistor 38 will fall below ground, consequently the junction of resistor 22 will be negative which in turn will make the anode of diode 3 more negative than the cathode, thus back biasing the diode and in effect presenting an open circuit to signals introduced at the input terminals 72. With channel A thus selected and channel B turned off, a signal from input 72 is transmitted through condenser 1 and then sees a low resistance path through diode 2 in the high resistance path through diode 3. Consequently, it would pass through diode 2 whereupon it sees an RC circuit represented by resistor 8 and capacitor 12 respectively. The purpose of the RC circuit is to remove high frequency noise from the signal; the frequencies to be removed may be pre-selected by proper choice of resistor 8 and capacitor 12. The signal next finds itself in the base circuit of transistor 17 which forms the first amplifying stage of the amplifier and is amplified and passed on to the base of NPN transistor 28. As previously described, the emitter of transistor 28 is coupled to a fixed and a variable resistor 29 and 30 respectively, and by proper selection of these resistors, the gain may be independently varied or pre-set for optimum response to a given frequency. The collector circuits of transistor 28 has a diode 35 and a resistor 44 and it will be observed that in the "on" position of channel A, diode 35 is biased in the forward mode since its anode is more positive than its cathode, because it is connected through resistor 44 and 46 to positive terminal 70; consequently, the signal amplified by transistor 28 sees a low resistance path through diode 35 and is easily passed through. At the same time, transistor 34 is biased off and thus its collector appears as an open circuit to a signal tending to feed through diode 36. Hence, it is seen that in this mode of operation, an input signal is coupled to diode 2 and then has high frequency noise removed from it, whereupon it is pre-amplified by PNP transistor 17 in a first amplification stage and it is again amplified by NPN transistor 28 in the second amplification stage and passed through to intermediate output 73.

The operating point of the amplifier is stabilized as follows: Assume the supply voltages V*cc* and V*ce* and the values of resistors 51, 54, and 55 are fixed, then the current flowing in resistor 51 will depend only on the potential applied to the base of transistor 53; essentially this same current flows through resistors 54 and 55 to negative supply, V*ce*. The potential developed by the current flowing in resistor 55 is compared to the potential developed across zener diode 7 by means of transistor 6 which is connected so as to maintain this current at a constant level.

Assume now that channel A is selected, and that the current in the collector of transistor 53 increases. This will cause the potential across resistor 55 to increase, which will cause transistor 6 to conduct more. With transistor 6 conducting more, transistor 17 is also made to conduct more, which in turn causes transistor 28 to conduct more, which in turn lowers the potential on the base of transistor 53 thus diminishing its emitter and collector current. Since condenser 56 is chosen to have a large capacitance, it filters out the signal across resistor 55. This, then, provides a filtering action preventing the circuit from going into unwanted oscillations.

If a magnetic tape is to be read which has recorded thereon information in a mode or code which is more suitably amplified by channel B (because the values of resistors and capacitors in that channel have been so chosen to give optimum gain and frequency filtering for that particular type of signal) then by setting a manual switch (not shown) so that pin 42 is grounded, the same sequence of operation would occur to channel B through their respective components as previously described for channel A.

It will be apparent from the foregoing disclosure of the invention ther numerous modifications, changes, and equivalents will now occur to those skilled in the art, all of which fall in the true spirit and scope contemplated by the invention.

What is claimed is:

1. A dual channel amplifier comprising:
   - a first amplifying network;
   - a second amplifying network coupled to said first amplifying network;
   - an input means coupled to said first and second amplifying networks for selectively introducing electric signals to said first and second amplifying networks;
   - an output means coupled to said first and second amplifying networks for selectively abstracting amplified electric signals from said first and second amplifying networks;
   - a switching electric network coupled to said first and second amplifying networks for selectively switching said amplifying networks alternately between states wherein in one state said first amplifying network is operative, while said second amplifying network is non-operative and wherein in the opposite state said first amplifying network is non-operative while said second amplifying network is operative;
   - a first biasing means coupled to said switching electric network for providing bias to effect the switching between states of said amplifying networks;
   - stabilizing circuit means coupled to said first and second amplifying networks for controlling the operating potential of said first and second networks whereby an operating point of said first and second networks is stabilized; and,
   - a second biasing means coupled to said stabilizing circuit means for providing bias to said stabilizing circuit means.

2. A dual channel amplifier as recited in claim 1 wherein said switching electric network comprises a first transistor having a collector and having an emitter and base selectively coupled between said first biasing means and ground;
   - a second transistor having a collector and also having an emitter and base selectively coupled between said first biasing means and ground;
   - a first diode having an anode and cathode with said anode coupled to said collector of said first transistor and said cathode coupled to said input means; and,
   - a second diode having an anode and cathode with said anode coupled to said collector of said second transistor and said cathode coupled to said input means.

3. A dual channel amplifier as recited in claim 2 wherein said transistor is a PNP transistor and said diode is a semiconductor diode.

4. A dual channel amplifier as recited in claim 2 including a first resistor coupled between said anode of said first diode and said collector of said first transistor;

a second resistor coupled between said anode of said second diode and said collector of said second transistor;

a first capacitor coupled between said collector of said first transistor and ground; and, a second capacitor coupled between said collector of said second transistor and ground.

5. A dual channel amplifier as recited in claim 2 wherein said first amplifying network comprises a first PNP transistor having a collector coupled to said second biasing means;

an emitter coupled to said collector of said first transistor;

a base coupled to said input means;

a first NPN transistor having a base coupled to said collector of said first PNP transistor;

an emitter coupled to said second biasing means;

a collector coupled to said first biasing means:

and wherein said second amplifying network comprises a second PNP transistor having a collector coupled to said second biasing means;

an emitter coupled to said collector of said second transistor;

a base coupled to said input means;

a second NPN tranSistor having a base coupled to said collector of said second PNP transistor;

an emitter coupled to said second biasing means; and, a collector coupled to said first biasing means.

6. A dual channel amplifier as recited in claim 5 including a first variable resistor coupled between said emitter of said first NPN transistor and said second biasing means for varying the gain of said first amplifying network; and, a second variable resistor coupled between said emitter of said second NPN transistor and said second biasinG means for varying the gain of said second amplifying network.

7. A dual channel amplifier as recited in claim 5 including a first RC network coupled to said first amplifying network for removing high frequency noise from said second amplifying network; and, a second RC network coupled to said second amplifying network for removing high frequency noise from said second amplifying network.

8. A dual channel amplifier as recited in claim 7 wherein said first RC network comprises a third resistor coupled between said anode of said first diode and said base of said first PNP transistor;

a third capacitor coupled between said base of said first PNP transistor and ground;

and wherein said second RC network comprises a fourth resistor coupled between said anode of said second diode and said base of said second PNP transistor; and, a fourth capacitor coupled between said base of said second PNP transistor and ground.

9. In combination with the read-head of a tape transport device of a type used in a computer system and comprising in general capstan drives, a read-head, and reading and control circuits, a dual channel amplifier comprising:

a. a first amplifying network;

b. a second amplifying network coupled to said first amplifying network;

c. an input means coupled to said first and second amplifying networks for selectively introducing electric signals to said first and second amplifying networks;

d. an output means coupled to said first and second amplifying networks for selectively abstracting amplified signals from said first and said second amplifying networks;

e. a switching electric network responsive to first bias signals, said switching network coupled to said first and second amplifying networks for selectively switching said networks alternately between states wherein in one state said first amplifying network is operative while said second amplifying network is non-operative, and where in the opposite state said first amplifying network is non-operative and said second amplifying network is operative;

f. and, stabilizing circuit means coupled to said first and second amplifying networks said stabilizing circuit means responsive to second bias signals for controlling the operating potential of said first and second networks whereby unwanted oscillations in said first and second networks are eliminated.

10. A dual channel amplifier in combination with a read-head of a tape transport device as recited in claim 9 wherein said switching electric network comprises:

a. a first transistor having a collector and having an emitter and base selectively coupled between said first biasing means and ground;

b. a second transistor having a collector and also having an emitter and base selectively coupled between said first biasing means and ground;

first diode having an anode and cathode with said anode coupled to said collector of said first transistor and said cathode coupled to said input means; and, d. a second diode having an anode and cathode with said anode coupled to said collector of said second transistor and said cathode coupled to said input means.

11. A dual channel amplifier as recited in claim 9 including stabilizing circuit meanS coupled to said first and second amplifying networks for providing compensating electric bias signals in response to unwanted electric signals when they appear on said first and said second amplifying networks for stabilizing the operating points of said first and second amplifying networks.

12. A dual channel amplifier comprising:

a first amplifying network;

a second amplifying network coupled to said first amplifying network;

a single input means coupled to said first and second amplifying networks for selectively introducing different types of electric signals to said first and second amplifying networks;

a single output means coupled to said first and second amplifying networks for selectively abstracting the amplified electric signals introduced at said input means;

an electronic switching means coupled to said first and second amplifying networks said electronic switching means responsive to first bias signals for selectively switching said amplifying networks between states wherein in one state said first amplifying network is operative while said second amplifying network is inoperative, and wherein in the opposite state said first amplifying network is inoperative while said second amplifying network is operative;

and operating - point stabilizing circuit means coupled to said first and second amplifying networks for stabilizing the operating potential of said first and second amplifying networks by controlling said operating potential.

13. A dual channel amplifier as recited in claim 12 including variable gain circuit means coupled to said first and second amplifying networks for independently adjusting the gain of said first and second amplifying networks respectively.

14. A dual channel amplifier as recited in claim 12 including noise removing circuit means coupled to said first and second amplifying networks for removing high frequency noise from said amplifying networks.

15. A dual channel amplifier as recited in claim 12 wherein said operating-point stabilizing circuit means comprise a first stabilizing transistor and a second stabilizing transistor coupled to each other and to said first and second amplifying networks.

16. A dual channel amplifier as recited in claim 15 including automatic bias circuit means for providing stabilizing bias to said operating-point stabilizing circuit means for the stabilization of said first and second amplifying networks, said automatic bias circuit means comprising a first bias resistor and bias capacitor parallel coupled to said first stabilizing transistor, a second bias resistor and bias capacitor parallel coupled to said second stabilizing transistor, and a zener diode coupled to said second stabilizing transistor.

17. A dual channel amplifier comprising:

a first amplifying network for optimally amplifying a first type of electronic signal;

a second amplifying network for optimally amplifyinG a second type electronic signal;

a single input means and a single output means coupled to said first and second amplifying networks for applying and abstracting electronic signals to and from said first and second amplifying networks respectively;

electronic enabling means coupled to said first and second amplifying networks for selectively providing enabling signals to said first amplifying network in responSe to a first bias signal applied to said electronic enabling means while providing disabling signals to said second amplifying networks, and for selectively providing enabling signals to said second amplifying network in response to a second bias signal applied to said enabling means while providing disabling signals to said first amplifying network; and, stabilizing circuit means coupled to said first and second amplifying networks for controlling the operating potential of said first and second amplifying networks whereby an operating point of said first and second amplifying networks is controlled.

18. A dual channel amplifier as recited in claim 17 including RC circuit means coupled to said first and second amplifying networks for automatically eliminating high frequency noise in either enabled said first or second amplifying networks, and further including gain adjusting circuit means coupled to said first and second amplifying networks for independently varying the gain in either of said first or second amplifying networks.

* * * * *

UNITED STATES PATENT OFFICE
CERTIFICATE OF CORRECTION

Patent No. 3,673,507 Dated June 27, 1972

Inventor(s) Robert S. Prescott

It is certified that error appears in the above-identified patent and that said Letters Patent are hereby corrected as shown below:

Column 5, line 26, "tranSistor" should read -- transistor --; line 35, "biasinG" should read -- biasing --; line 40, cancel "second" and insert -- first --; column 6, line 20, before "first" insert--c. a--; line 27,"meanS" should read -- means --; column 7, line 8, "amplifyinG" should read -- amplifying --; line 16, "responSe" should read -- response --.

Signed and sealed this 19th day of December 1972.

(SEAL)
Attest:

EDWARD M.FLETCHER,JR.
Attesting Officer

ROBERT GOTTSCHALK
Commissioner of Patents